W. V. SEIFERT.
WELL DIGGING MACHINE.
APPLICATION FILED NOV. 28, 1919.

1,414,590.

Patented May 2, 1922.
2 SHEETS—SHEET 1.

William V. Seifert, Inventor

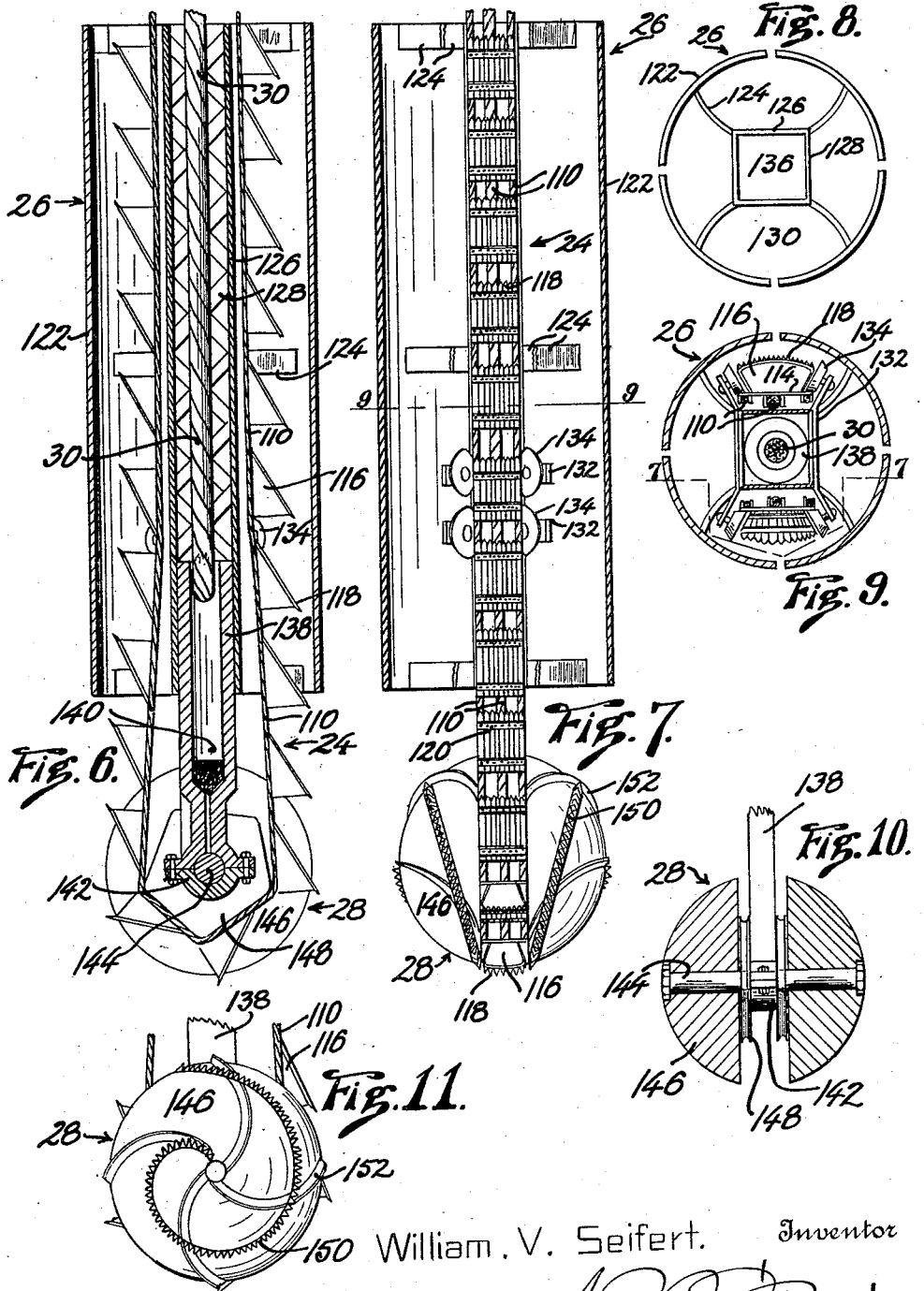

UNITED STATES PATENT OFFICE.

WILLIAM V. SEIFERT, OF THURMAN, COLORADO.

WELL-DIGGING MACHINE.

1,414,590.   Specification of Letters Patent.   Patented May 2, 1922.

Application filed November 28, 1919. Serial No. 341,110.

*To all whom it may concern:*

Be it known that I, WILLIAM V. SEIFERT, a citizen of the United States, residing at Thurman, county of Washington, and State of Colorado, have invented certain new and useful Improvements in Well-Digging Machines; and I do declare the following to be a full, clear, and exact description of the invention, such as will enable others skilled in the art to which it appertains to make and use the same, reference being had to the accompanying drawings, and to the characters of reference marked thereon, which form a part of this specification.

This application is a continuation in part of my earlier application, filed June 7th 1919, Serial No. 302,399.

The object of this invention is to provide an efficient digging machine for wells by means of which an endless conveyor and excavating element may be used. This is accomplished by mounting the conveyor on a truck by means of pulleys, one of which is bodily movable to lower the conveyor as the excavation is made, and to raise the same. The depending portion of the conveyor is provided with a digging ball, which is rotated by the movement of the conveyor and which also is provided with digging fingers. A cylindrical member is positioned above the ball and connected therewith for the purpose of guiding the conveyor, and this member also contains means for retracting the conveyor to a width less than the diameter of the hole being dug.

In the drawings:

Fig. 4 is a fragmentary elevation of a portion of the conveyor looking from the side.

Fig. 5 is a similar view, looking from the front.

Figure 1:
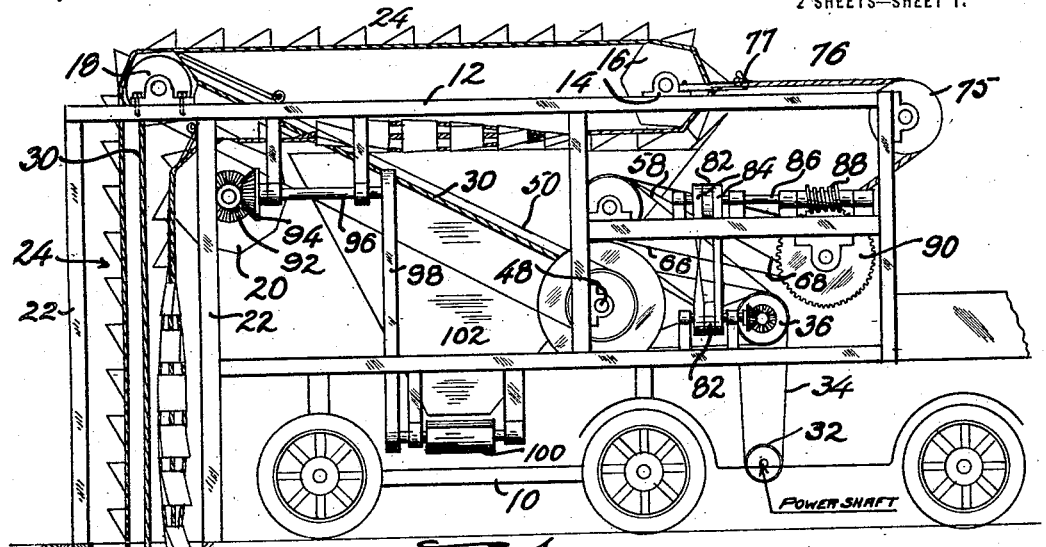
Fig. 1 is an elevation, showing the device in operation.
Figure 2:
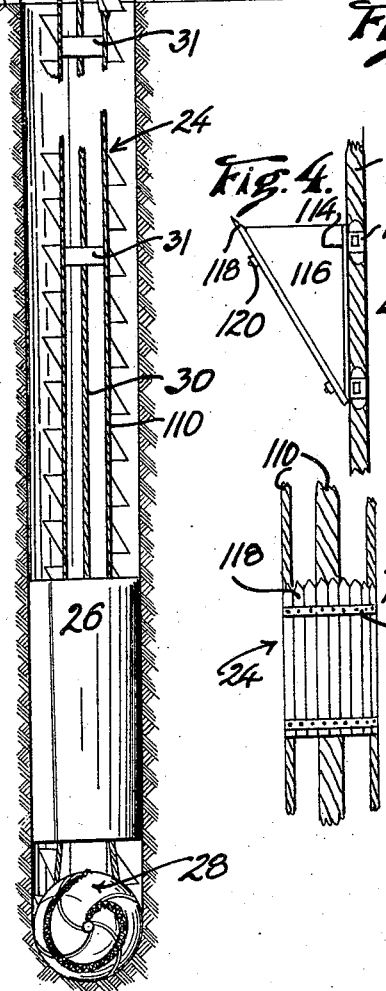
Fig. 2 is a detailed plan of part of the power transmission.
Figure 2:
Figure 3:
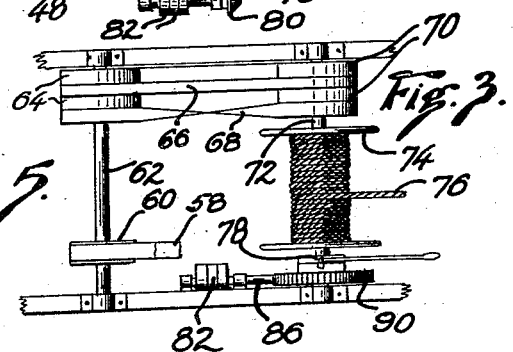
Fig. 3 is a detailed plan of another part thereof.

These figures show one of the buckets on the conveyor.

Fig. 6 is a section showing the equipment at the lower end of the conveyor.

Fig. 7 is a section taken in general at right angles to that of Fig. 6 and more particularly on the line 7—7 of Fig. 9.

Fig. 8 is a plan showing the construction of the cylindrical guiding member, the conveyor being omitted.

Fig. 9 is a cross-section taken on line 9—9 of Fig. 7.

Fig. 10 is a section taken through the ball at right angles to the view of Fig. 6, the conveyor being omitted.

Fig. 11 is a side view of the ball at right angles to that of Fig. 7.

A truck 10 is provided at its top with rails 12, upon which blocks 14 slide, constituting bearings, for a pulley 16. A pulley 18 is fixed at the outer ends of these rails. Another pulley 20 is positioned as shown, being mounted upon one of the uprights 22, which are adapted to rest upon the ground, where the well is being dug, to support the main weight of the conveyor.

The conveyor in general is indicated at 24, and cooperates with a guiding cylinder 26 and a ball 28, positioned at the lower end of the conveyor at the bottom of the hole. A cylinder 26 is connected with the ball 28 and these are adapted to be raised and lowered through the medium of a cable 30, passing over a pulley at the top of the support, as indicated, and adapted to be maintained in spaced relation from the runs of the conveyor by spacing means 31.

The device is driven by means of a pulley 32, which may be driven from the transmission of an engine mounted on the truck 10. A belt 34 extends from the pulley 32 to a pulley 36, mounted upon a drive shaft 38 and carrying fast and loose pulleys 40, co-operating with belts 42 and 44, running over pulleys 46 on a shaft 48. The belts 42 and 44 are manipulated by means of belt shifters (not shown) for the purpose of imparting forward and reverse movements respectively. A belt 50 passing from the pulley on the shaft 48 extends to the pulley 18 to drive the conveyor. The shaft 48 is equipped with a reel 52, which receives the cable 30 and is adapted to be driven through the medium of the shaft 48 and a clutch 54. The shaft 38 is also provided with a pulley 56, carrying a belt 58, which extends to a pulley 60 on a shaft 62, mounted above the shaft 48.

By means of fast and loose pulleys 64, belts 66 and 68, and pulleys 70, a shaft 72 is driven either forward or reverse as desired, belt shifters (not shown) being used. The shaft 72 carries a reel 74, receiving a cable 76, which passes over a pulley 75 on the framework and is connected with the sliding pulley 16 by means of a hook 77. The reel 74 is thrown in by means of a clutch 78. The shaft 38 is provided at one end with a bevel gear 79, meshing with a bevel gear 80, driving the pulleys 82 on upper and lower shafts and cooperating with belts 84. The upper shaft 86 is provided with a worm 88, driving a gear 90 on the shaft 72 and also adapted to be connected with the reel 74 by the clutch 78. By this means the reel 74 may be driven rapidly to move the conveyor pulley 16, or it may be driven slowly in order to lower the digging mechanism as excavation takes place. The pulley 20, which is driven by means of the conveyor, is provided with a bevel gear 92, meshing with a bevel gear 94, which drives a shaft 96 and through the medium of a belt 98 drives a horizontally disposed conveyor 100, to discharge earth fed into the hopper 102 by the conveyor.

The conveyor as shown comprises three cables 110, to which there is secured by means of clips 112 the back plates 114 of the conveyor buckets 116. The forward sides of these buckets are composed of metal strips 118, pointed at their upper ends for digging purposes, and these strips are held together and to the bucket by means of crossbars 120. In this manner, each bucket in itself constitutes a digging element.

The cylindrical member 26, which is positioned about the lower portion of the conveyor, is composed of a plurality of curved, vertically disposed plates 122, separated when in their normal condition, as shown, these plates being supported by means of spring fingers 124, connected with a central box, composed of side plates 126 and end strips 128, forming lattice work, these fingers being curved as shown to form two pockets 130 on opposite sides of the center box. Strips 132 are secured to the lower portion of the box and carry at their ends beveled rollers 134, adapted to engage the edges of the back plates 114 of the conveyor buckets 116. The function of this is to draw the runs of the conveyor towards each other after leaving the digging ball 28, which is constructed to spread the tips of the pointed strips 118 to the diameter of the hole.

For efficient work these buckets must then be drawn away from the sides of the hole as they are elevated, in order not only to avoid the hole itself, but to avoid the walls 122 of the guide cylinder 26.

The center box of the guide 26 thus provides a space 136, and in this at the lower end there is secured a shank 138, hollowed out as indicated at 140 to receive oil for a bearing 142, at the lower end of the shank which carries a shaft 144.

The upper end of the shank 138 has the cable 30 fixed thereto, and in this manner the guide 26 is also supported by the cable 30.

The shaft 144 has fixed thereto the solid halves 146 of the ball 28. These halves have rigidly mounted thereon pulleys 148, to receive the side cables 110 of the conveyor, the faces of the pulleys being flattened to accommodate the backs of the buckets, as indicated. In this manner movement of the conveyor rotates the pulleys, and hence the parts 146 of the ball. The face of the ball is provided with series of spirally-arranged chisels 150, which dig out the earth from the sides of the ball to the edges of the halves, cooperating with the points 118 on the buckets which dig at the bottom of the hole. The surface of the ball is also provided with scrapers 152, arranged to feed the earth loosened by the chisels 150 to the buckets 116 of the conveyor.

From the foregoing it will be seen that the guide 26, positions the ball accurately so that the hole is dug straight down, and that the points 118 of the buckets cooperate with the chisels 150 of the ball. The ball is sufficiently heavy that in conjunction with the weight of the conveyor the device will perform efficient work.

I claim:

1. A digging machine, comprising a truck, an endless excavating carrier mounted to travel on the truck and to depend into a hole, a bodily movable pulley mounted on the truck and over which the carrier travels, means to control the bodily movement of said pulley, and a weighted member also adapted to depend into the hole and around which said carrier travels, and flexible means by which solely said weighted member is supported.

2. A digging machine, comprising a truck, an endless excavating carrier mounted to travel on the truck and to depend into a hole, a bodily movable pulley mounted on the truck and over which the carrier travels, means to control the bodily movement of said pulley, a weighted member also adapted to depend into the hole and around which said carrier travels, said weighted member being adapted for vertical movement in the hole, and means to control said movement, said means comprising a cable extending to and operable from said truck, said cable and carrier constituting flexible means by which solely said weighted member is controlled and operated.

3. A digging machine comprising a truck, an endless carrier mounted to travel on the truck and to depend into a hole, a bodily movable pulley mounted on the truck over which said conveyor passes, and a weighted excavating member adapted to depend into the hole and around which also the carrier passes, said weighted member being driven solely by said carrier.

4. A digging machine comprising a truck, an endless carrier mounted to travel on the truck and to depend into a hole, a bodily movable pulley mounted on the truck over which said conveyor passes, and a weighted excavating member adapted to depend into the hole and around which also the carrier passes, said member being adapted to be driven by the movement of the carrier.

5. A digging machine comprising a truck, an endless carrier mounted to travel on the truck and to depend into a hole, a bodily movable pulley mounted on the truck over which said conveyor passes, a weighted excavating member adapted to depend into the hole and around which also the carrier passes, and a hollow guide connected with said member and through which said conveyor passes.

6. A digging machine comprising a truck, an endless carrier mounted to travel on the truck and to depend into a hole, a bodily movable pulley mounted on the truck over which said conveyor passes, and a weighted excavating member adapted to depend into the hole and around which also the carrier passes, said member being adapted to be driven by the movement of the carrier, and comprising a divided ball between the parts of which the conveyor extends.

7. A digging machine comprising a truck, an endless carrier mounted to travel on the truck and to depend into a hole, a bodily movable pulley mounted on the truck over which said conveyor passes, and a weighted excavating member adapted to depend into the hole and around which also the carrier passes, said member being adapted to be driven by the movement of the carrier, and comprising a dividing ball between the parts of which the conveyor extends, the ball parts carrying excavating means.

8. A digging machine comprising an endless conveyor adapted to extend into a hole, a support therefor, a ball on the lower end of the conveyor having excavating means thereon, and a pulley on the ball for driving the same by movement of the conveyor.

9. A digging machine comprising an endless conveyor adapted to extend into a hole, a support therefor, a ball on the lower end of the conveyor having excavating means thereon, a pulley on the ball for driving the same by movement of the conveyor, and a hollow guide connected with the ball and through which the conveyor passes.

10. A digging machine comprising an endless conveyor adapted to extend into a hole, a support therefor, a ball on the lower end of the conveyor having excavating means thereon, a pulley on the ball for driving the same by movement of the conveyor, a hollow guide connected with the ball and through which the conveyor passes, and a cable extending from the support and connected with said ball and guide for supporting and elevating them.

11. A digging machine comprising an endless conveyor adapted to extend into a hole, a support therefor, a ball on the lower end of the conveyor having excavating means thereon, a pulley on the ball for driving the same by movement of the conveyor, and a hollow guide connected with the ball and through which the conveyor passes, said guide comprising a plurality of vertical compressible walls.

12. A digging machine comprising a support, an endless conveyor thereon adapted to extend into a hole, excavating means on the conveyor, a weighted member on the lower end of the conveyor having a pulley thereon around which the conveyor passes and by means of which the conveyor is expanded at the bottom to the diameter of the hole, a hollow guide connected with said member and through which the conveyor passes, and means within the guide to draw the runs of the conveyor within the guide to a width less than the diameter of the hole.

13. A digging machine comprising a support, an endless conveyor thereon adapted to extend into a hole, excavating means on the conveyor, a weighted member on the lower end of the conveyor having a pulley thereon around which the conveyor passes and by means of which the conveyor is expanded at the bottom to the diameter of the hole, a hollow guide connected with said member and through which the conveyor passes, and means within the guide to draw the runs of the conveyor within the guide to a width less than the diameter of the hole, said weighted member being adapted to be driven by said conveyor and having digging means thereon to cooperate with the excavating means on the conveyor.

14. A digging machine comprising a support, an endless conveyor thereon adapted to extend into a hole, excavating means on the conveyor, a weighted member on the lower end of the conveyor having a pulley thereon around which the conveyor passes and by means of which the conveyor is expanded at the bottom to the diameter of the hole, a hollow guide connected with said member and through which the conveyor passes, and means within the guide to draw the runs of the conveyor within the guide to a width less than the diameter of the hole, said weighted member being adapted to be driven by said conveyor and having digging means thereon to cooperate with the excavating means on the conveyor, said member also having means thereon to feed earth loosened by its digging means to the conveyor.

15. A digging machine comprising a support, an endless conveyor thereon adapted to extend into a hole, excavating means on the conveyor, a divided ball on the lower end of the conveyor adapted to be driven by the conveyor and between the parts of which the conveyor passes, and digging means on the ball to cooperate with the excavating means of the conveyor.

16. A digging machine comprising a support, an endless conveyor thereon adapted to extend into a hole, excavating means on the conveyor, a divided ball on the lower end of the conveyor adapted to be driven by the conveyor and between the parts of which the conveyor passes, digging means on the ball to cooperate with the excavating means of the conveyor, means on the ball to expand the conveyor to the diameter of the hole, and means above the ball to contract the conveyor to a width less than the diameter of the hole.

17. A digging machine comprising a support, an endless conveyor thereon adapted to extend into a hole, excavating means on the conveyor, a divided ball on the lower end of the conveyor adapted to be driven by the conveyor and between the parts of which the conveyor passes, digging means on the ball to cooperate with the excavating means of the conveyor, means on the ball to expand the conveyor to the diameter of the hole, means above the ball to contract the conveyor to a width less than the diameter of the hole, and a hollow guide above the ball through which the conveyor passes when contracted to said width.

18. A digging machine comprising a support, an endless conveyor thereon adapted to extend into a hole, excavating means on the conveyor, a divided ball on the lower end of the conveyor adapted to be driven by the conveyor and between the parts of which the conveyor passes, digging means on the ball to cooperate with the excavating means of the conveyor, means on the ball to expand the conveyor to the diameter of the hole, means above the ball to contract the conveyor to a width less than the diameter of the hole, and a hollow guide above the ball through which the conveyor passes when contracted to said width, said contracting means and said guide being connected with said ball.

In testimony whereof I affix my signature.

WILLIAM V. SEIFERT.